United States Patent
Zhou et al.

(10) Patent No.: US 11,089,530 B2
(45) Date of Patent: Aug. 10, 2021

(54) REPORTING NEW BEAM INFORMATION IN A BEAM FAILURE RECOVERY PROCEDURE

(71) Applicant: QUALCOMM Incorporated, San Diego, CA (US)

(72) Inventors: Yan Zhou, San Diego, CA (US); Tao Luo, San Diego, CA (US); Jung Ho Ryu, Fort Lee, NJ (US); Tianyang Bai, Bridgewater, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/797,849

(22) Filed: Feb. 21, 2020

(65) Prior Publication Data

US 2020/0288371 A1 Sep. 10, 2020

Related U.S. Application Data

(60) Provisional application No. 62/814,228, filed on Mar. 5, 2019.

(51) Int. Cl.
*H04W 36/30* (2009.01)
*H04W 36/00* (2009.01)
*H04W 36/06* (2009.01)
*H04W 36/36* (2009.01)

(52) U.S. Cl.
CPC ..... *H04W 36/305* (2018.08); *H04W 36/0058* (2018.08); *H04W 36/06* (2013.01); *H04W 36/36* (2013.01)

(58) Field of Classification Search
CPC ... H04W 36/305; H04W 36/36; H04W 36/06; H04W 36/0058

USPC ................................................... 375/260, 267
See application file for complete search history.

(56) References Cited

U.S. PATENT DOCUMENTS

| | | | |
|---|---|---|---|
| 2018/0278310 A1 | 9/2018 | Lee et al. | |
| 2019/0058629 A1* | 2/2019 | Akoum | H04W 56/001 |
| 2019/0274098 A1* | 9/2019 | Cheng | H04L 5/0091 |
| 2019/0297537 A1* | 9/2019 | Tsai | H04W 76/27 |
| 2019/0306924 A1* | 10/2019 | Zhang | H04W 72/046 |
| 2020/0245176 A1 | 7/2020 | Zhou | |

FOREIGN PATENT DOCUMENTS

| | | |
|---|---|---|
| WO | 2018204255 A1 | 11/2018 |
| WO | 2019029709 A1 | 2/2019 |
| WO | 2019032882 A1 | 2/2019 |

OTHER PUBLICATIONS

International Search Report and Written Opinion—PCT/US2020/019469—ISA/EPO—dated May 8, 2020.

* cited by examiner

*Primary Examiner* — Fitwi Y Hailegiorgis
(74) *Attorney, Agent, or Firm* — Qualcomm IP Dept.; James Hunt Yancey, Jr.

(57) ABSTRACT

Various aspects of the present disclosure generally relate to wireless communication. In some aspects, a user equipment (UE) may identify one or more candidate beams available for communication between the UE and a BS to replace another beam that is configured for communicating between the UE and the BS. The UE may transmit, based at least in part on identifying the one or more candidate beams, a communication that includes a new beam information (NBI) field and/or contents of the NBI field. Numerous other aspects are provided.

24 Claims, 13 Drawing Sheets

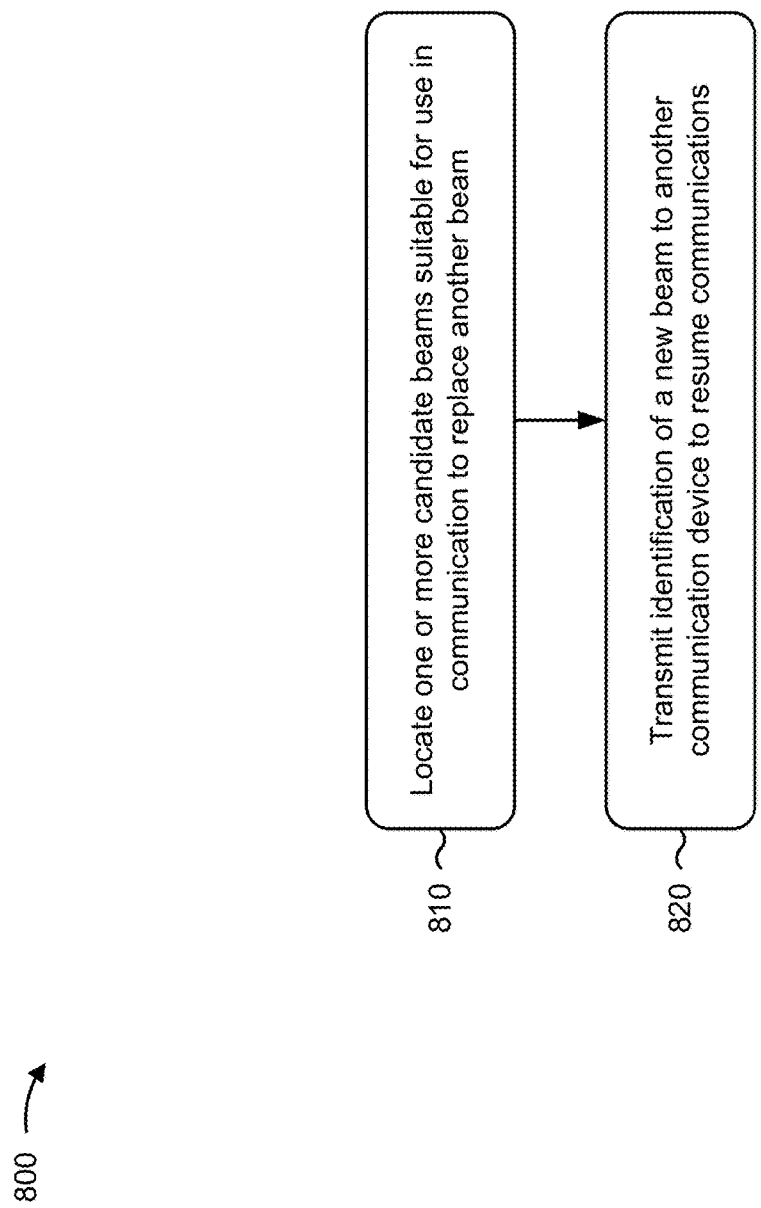

REPORTING NEW BEAM INFORMATION IN A BEAM FAILURE RECOVERY PROCEDURE

CROSS-REFERENCE TO RELATED APPLICATION

This application claims priority to U.S. Provisional Application No. 62/814,228, filed on Mar. 5, 2019, entitled "REPORTING NEW BEAM INFORMATION IN A BEAM FAILURE RECOVERY PROCEDURE," which is hereby expressly incorporated by reference herein as if fully set forth below in its entirety and for all applicable purposes

TECHNICAL FIELD

Aspects of the technology described below generally relate to wireless communication, and more particularly to techniques and apparatuses for reporting beam information in communication scenarios (e.g., new beam information in a beam failure recovery (BFR) procedure). Some techniques and apparatuses described herein enable and provide wireless communication devices and systems configured for enhanced beam failure handling, beam management, and/or beam recovery.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include identifying one or more candidate beams available for communication between the UE and a base station (BS) to replace another beam that is configured for communicating between the UE and the BS. The method can also include transmitting, based at least in part on identifying the one or more candidate beams, a communication that includes a new beam information (NBI) field and/or contents of the NBI field.

In some aspects, a UE for wireless communication may include memory and one or more processors operatively coupled to the memory. The memory and the one or more processors may be configured to identify one or more candidate beams available for communication between the UE and a BS to replace another beam that is configured for communicating between the UE and the BS. The memory and the one or more processors may be configured to transmitting, based at least in part on identifying the one or more candidate beams, a communication that includes a NBI field and/or contents of the NBI field.

In some aspects, a non-transitory computer-readable medium may store one or more instructions for wireless communication. The one or more instructions, when executed by one or more processors of a UE, may cause the one or more processors to identify one or more candidate beams available for communication between the UE and a BS to replace another beam that is configured for communicating between the UE and the BS. The one or more instructions, when executed by one or more processors of a UE, may cause the one or more processors to transmit, based at least in part on identifying the one or more candidate beams, a communication that includes an NBI field and/or contents of the NBI field.

In some aspects, an apparatus for wireless communication may include means for identify one or more candidate beams available for communication between the apparatus and a BS to replace another beam that is configured for communicating between the apparatus and the BS. The apparatus may include means for transmitting, based at least in part on identifying the one or more candidate beams, a communication that includes an NBI field and/or contents of the NBI field.

In some aspects, a method of wireless communication, performed by a UE, may include detecting a beam failure of a beam that is used for communication between the UE and a BS. The method may include identifying one or more candidate beams available for communication between the UE and the BS, where the one or more candidate beams are different from the failed beam. The method may include generating respective beam quality measurements for the one or more candidate beams based at least in part on one or more reference signals configured for the one or more candidate beams. The method may include configuring an NBI field in a communication based at least in part on whether the respective beam quality measurements satisfy a beam quality threshold configured for the one or more reference signals.

In some aspects, a UE for wireless communication may include memory and one or more processors operatively coupled to the memory. The memory and the one or more processors may be configured to detect a beam failure of a beam that is used for communication between the UE and a BS. The memory and the one or more processors may be configured to identify one or more candidate beams available for communication between the UE and the BS, where the one or more candidate beams are different from the failed beam. The memory and the one or more processors may be configured to generate respective beam quality measurements for the one or more candidate beams based at least in part on one or more reference signals configured for the one or more candidate beams. The memory and the one or more processors may be configured to configure an NBI field in a communication based at least in part on whether the respective beam quality measurements satisfy a beam quality threshold configured for the one or more reference signals.

In some aspects, a non-transitory computer-readable medium may store one or more instructions for wireless communication. The one or more instructions, when executed by one or more processors of a UE, may cause the one or more processors to detect a beam failure of a beam that is used for communication between the UE and a BS. The one or more instructions, when executed by one or more processors of a UE, may cause the one or more processors to identify one or more candidate beams available for communication between the UE and the BS, where the one or more candidate beams are different from the failed beam. The one or more instructions, when executed by one or more processors of a UE, may cause the one or more processors to generate respective beam quality measurements for the one or more candidate beams based at least in part on one or more reference signals configured for the one or more candidate beams. The one or more instructions, when executed by one or more processors of a UE, may cause the one or more processors to configure a NBI field in a communication based at least in part on whether the respective beam quality measurements satisfy a beam quality threshold configured for the one or more reference signals.

In some aspects, an apparatus for wireless communication may include means for detecting a beam failure of a beam that is used for communication between the apparatus and a BS. The apparatus may include means for identifying one or more candidate beams available for communication between the apparatus and the BS, where the one or more candidate beams are different from the failed beam. The apparatus may include means for generating respective beam quality measurements for the one or more candidate beams based at least in part on one or more reference signals configured for the one or more candidate beams. The apparatus may include means for configuring an NBI field in a communication based at least in part on whether the respective beam quality measurements satisfy a beam quality threshold configured for the one or more reference signals.

In some aspects, a method for wireless communication, performed by a UE, may include locating one or more candidate beams suitable for use in communication to replace another beam. The method may include transmitting identification of a new beam to another communication device to resume communications. The method may include configuring the new beam information in a communication to include as part of the identification of the new beam for transmission to the other communication device.

In some aspects, a UE for wireless communication may include memory and one or more processors operatively coupled to the memory. The memory and the one or more processors may be configured to locate one or more candidate beams suitable for use in communication to replace another beam. The memory and the one or more processors may be configured to transmit identification of a new beam to another communication device to resume communications. The memory and the one or more processors may be configured to configure the new beam information in a communication to include as part of the identification of the new beam for transmission to the other communication device.

In some aspects, a non-transitory computer-readable medium may store one or more instructions for wireless communication. The one or more instructions, when executed by one or more processors of a UE, may cause the one or more processors to locate one or more candidate beams suitable for use in communication to replace another beam. The one or more instructions, when executed by one or more processors of a UE, may cause the one or more processors to transmit identification of a new beam to another communication device to resume communications. The one or more instructions, when executed by one or more processors of a UE, may cause the one or more processors to configure the new beam information in a communication to include as part of the identification of the new beam for transmission to the other communication device.

In some aspects, an apparatus for wireless communication may include means for locating one or more candidate beams suitable for use in communication to replace another beam. The apparatus may include means for transmitting identification of a new beam to another communication device to resume communications. The apparatus may include means for configuring the new beam information in a communication to include as part of the identification of the new beam for transmission to the other communication device.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIGS. 6-8 are diagrams illustrating example processes performed, for example, by a UE, in accordance with various aspects of the present disclosure.

DETAILED DESCRIPTION

Figure 1:
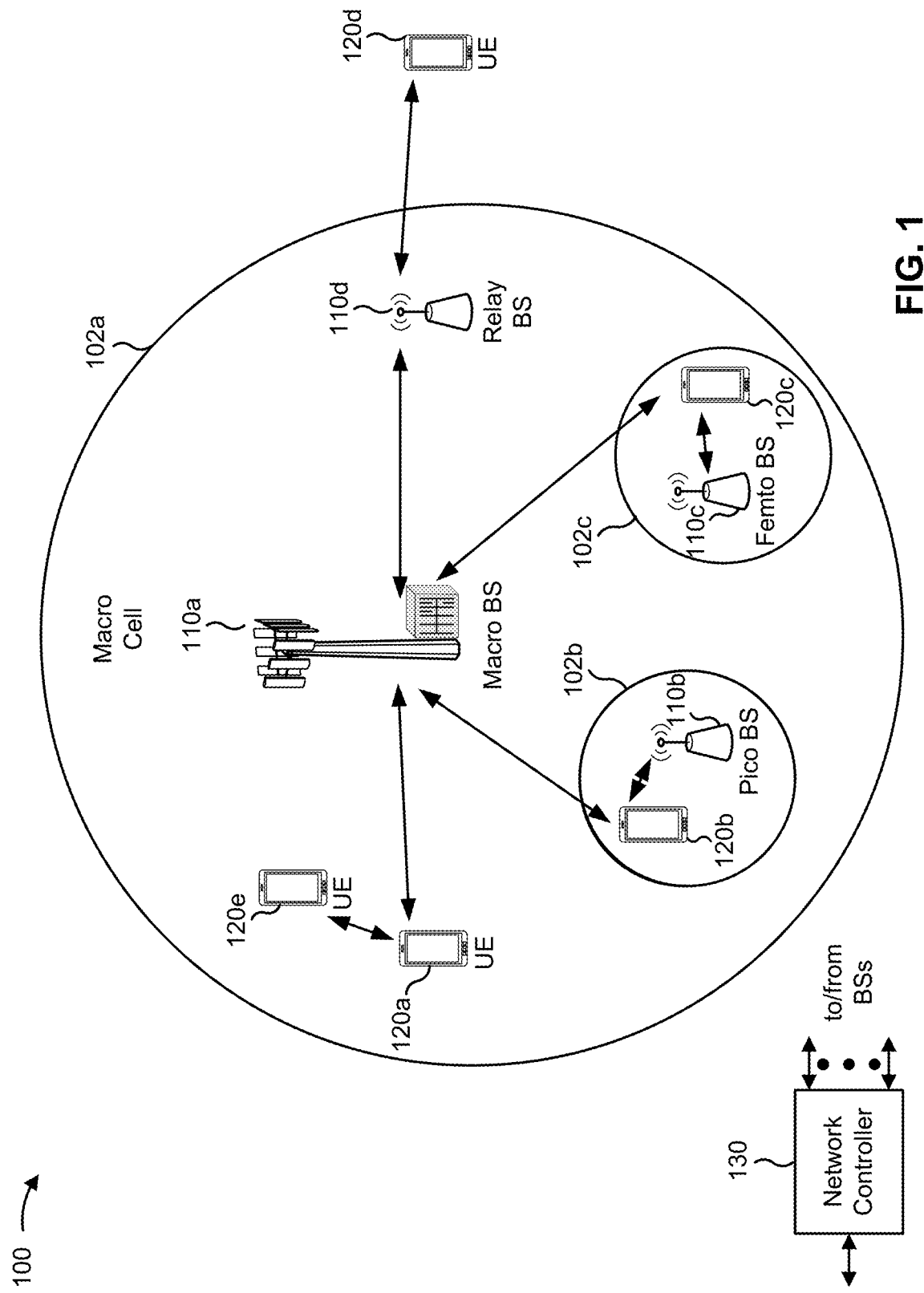
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. In some deployments, a BS may be known as a scheduling entity (e.g., in that it can schedule communications of other devices). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for areas of varying sizes or ranges. BSs can be configured to enable communication in a variety of cell arrangements, including a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary. A cell that is mobile enables a geographic area of the cell to move according to the location of a mobile BS. In some aspects, a UE can be configured to carry out BS functionality. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts), and pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicle, a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. Further, in some deployments, UEs may be referred to as scheduled entities (e.g., in that UE communication may be scheduled by another entity (e.g., a BS or another scheduling entity).

In general, any number of wireless networks may be deployed in a given geographic area. That is, multiple wireless networks can exist and be deployed simultaneously in a given area. Some devices can be multi-mode devices and configured to communicate with multiple networks. In some deployments, devices may only operate with one and/or with limited networks (e.g., a 5G stand-alone device). Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described herein as being performed by the base station 110.

As indicated above, FIG. 1 is provided merely as an example. Other examples may differ from what is described with regard to FIG. 1.

Figure 2:
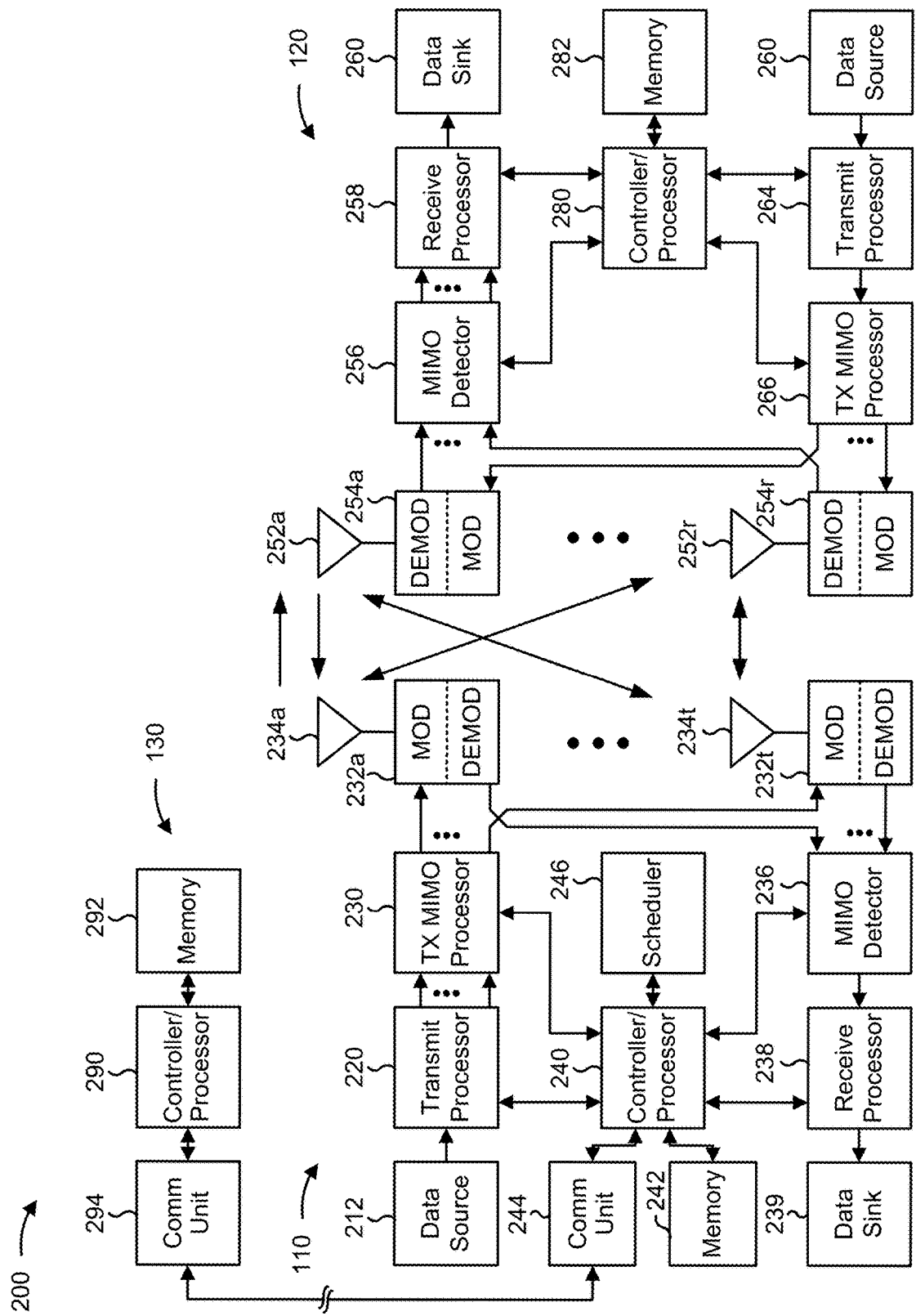
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reporting new beam information in a beam failure recovery (BFR) procedure, as described in more detail herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying one or more candidate beams available for communication between the UE 120 and a BS 110 to replace another beam that is configured for communicating between the UE 120 and the BS 110, means for transmitting, based at least in part on identifying the one or more candidate beams, a communication that includes a new beam information (NBI) field and/or contents of the NBI field, and/or the like. In some aspects, UE 120 may include means for detecting a beam failure of a beam that is used for communication between the UE 120 and a BS 110, means for identifying one or more candidate beams available for communication between the UE 120 and the BS 110, where the one or more candidate beams are different from the failed beam, means for generating respective beam quality measurements for the one or more candidate beams based at least in part on one or more reference signals configured for the one or more candidate beams, means for configuring a NBI field in a communication based at least in part on whether the respective beam quality measurements satisfy a beam quality threshold configured for the one or more reference signals, and/or the like. In some aspects, UE 120 may include means for locating one or more candidate beams suitable for use in communication to replace another beam, means for transmitting identification of a new beam to another communication device to resume communications, means for configuring the new beam information in a communication to include as part of the identification of the new beam for transmission to the other communication device, and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided merely as an example. Other examples may differ from what is described with regard to FIG. 2.

Figure 3A:
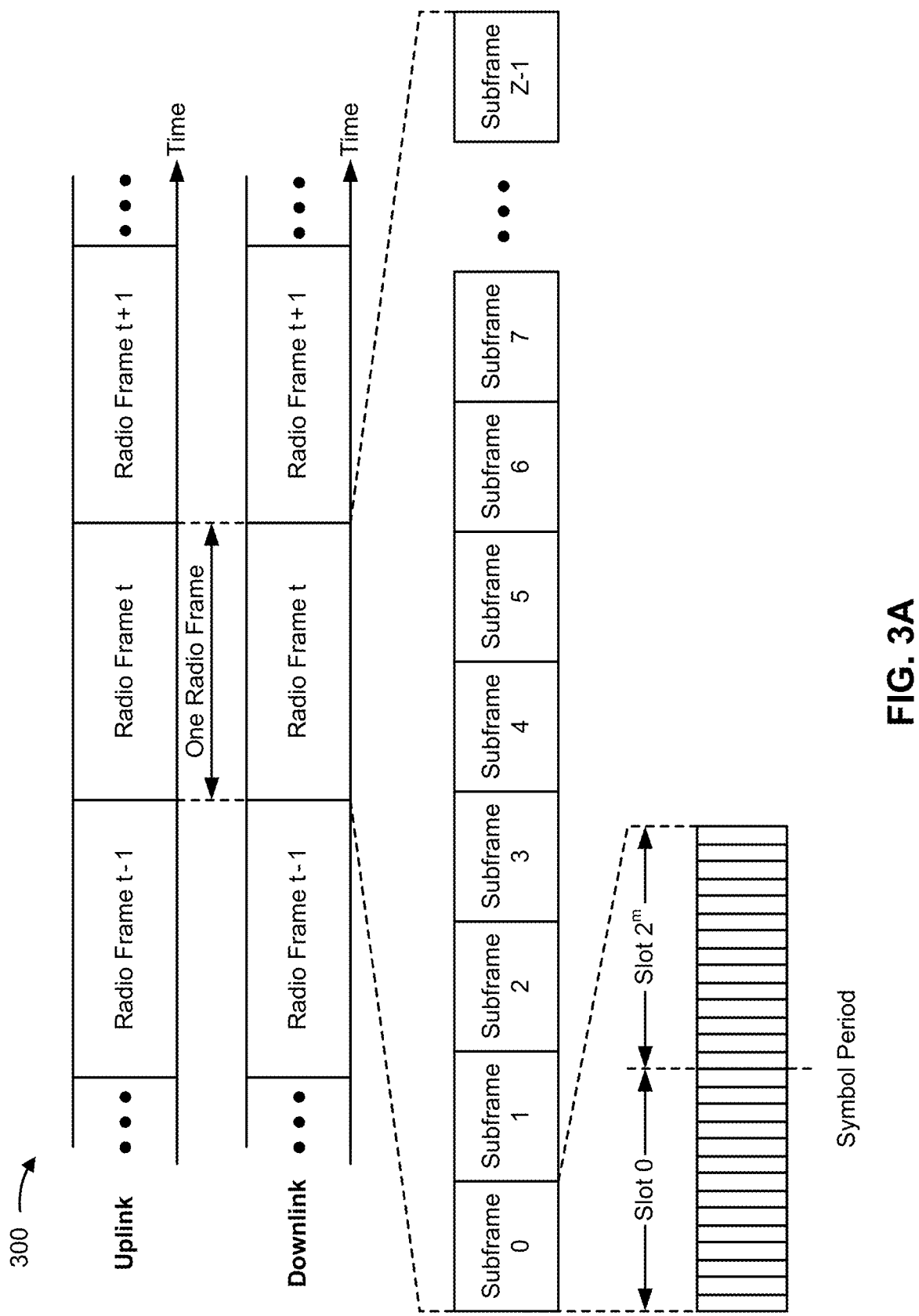
FIG. 3A is a block diagram conceptually illustrating an example of a communication structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures. These additional structural types may be referred to using terms other than "frame," "subframe," "slot," and/or the like in 5G NR. In some aspects, a wireless communication structure may refer to a periodic time-bounded communication unit defined by a wireless communication standard and/or protocol. (e.g., protocol unit, protocol data unit). Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
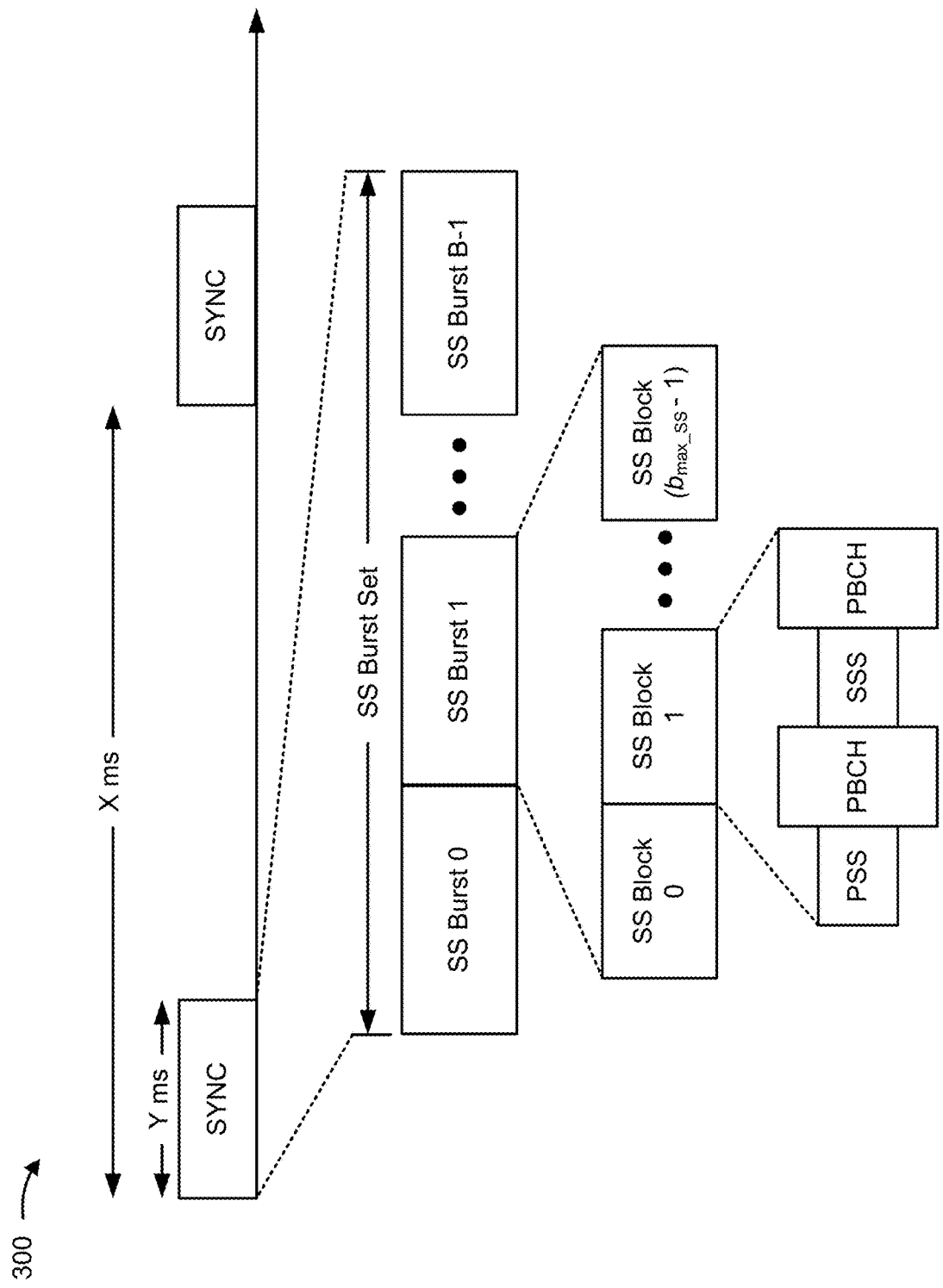
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period. In a burst period, SS blocks of the SS burst are transmitted. A base station can transmit SS burst transmissions (e.g., according to a burst period). In some scenarios, one or more SS blocks may be repeated during each SS burst. In some aspects, the SS burst set may have a burst set periodicity. In some aspects, SS bursts of the SS burst set may be transmitted by a base station according to a fixed burst set periodicity. In some deployments, one or more SS bursts may be repeated during each SS burst set.

The base station may transmit system information. This system information may include system information blocks (SIBs), on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
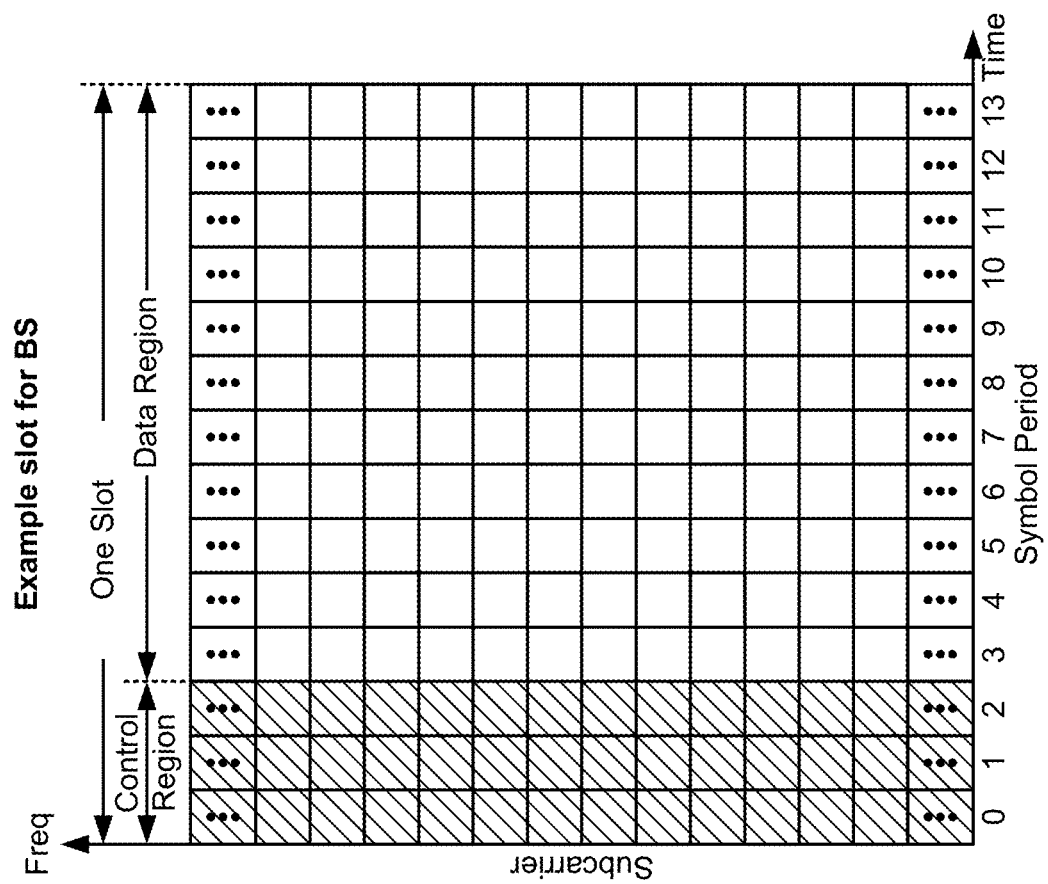
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

In a wireless network, a UE may communicate with a BS using one or more beams. In the event of a beam failure, it may be appropriate for a UE to identify and/or report a new beam for communicating with the BS (e.g., if a candidate beam with suitable quality is available for communications with the BS). For example, the UE may determine that a beam failure, of a beam that is used for communication with a BS, occurred. UEs able to detect beam failure can report beam failure and seek other beams for communication.

Beam failure can include a range of beam states. Beam failure can include total signal disruption (e.g., by an obstacle, transmit stoppage, receive difficulty). Beam failure can also include partial signal disruption scenarios. In some partial signal disruption scenarios, signal transmissions may still occur yet none or very little meaningful data/information in the signal can be sampled and/or retrieved. Still yet beam failure can occur if signal quality is distorted or modified during transmission and received having undesired characteristics (e.g., power level below or undesired relative to a threshold, beam quality below or undesired relative to a threshold, undetectable reference signal, etc.). Beam failure scenarios can be experienced or occur when a UE is moving from BS to BS (i.e., cell to cell) during mobility events. For mobile UEs (or mobile BSs), aspects discussed herein envision continued network access during mobility events and re-establishing beam communications when beam failures occur from time to time. While beam failure may relate to scenarios where beams are not detected or received, failure scenarios may also occur when beams are received, yet received in situations where beam characteristics are undesired or disfavored.

During communication operations, a UE can take a variety of actions during failure scenarios. One type of action a UE may take upon beam failure detection is taking action to scout out new beam options for communication. As one example, a UE can send beam status reports to other communication devices. Additionally or alternatively, as another example, a UE may identify a new candidate beam to use for communication with a BS. A new beam may be used to transmit a beam failure recovery request (BFRQ) indication. A UE can direct a BFRQ to other wireless communication devices, including one or more BSs. A UE utilizing a BFRQ enables continued communication with a BS after transmitting the BFRQ communication, and/or the like. While in some scenarios, a UE may communication with a new beam, it is possible that a UE may communicate with a prior-used beam as chancel conditions change from time to time In some cases, it may be challenging for a UE to perform beam reporting. A UE may be unable to report beam failures for different configurations of candidate beams. For example, some candidate beams may have configured reference signals, beam quality thresholds, and/or the like, while other candidate beams may not have configured reference signals, beam quality thresholds, and/or the like. This may lead to the UE being unable to identify a new beam among the candidate beams, may lead to the UE being unable to determine the format and/or content of information that is to be included in a BFRQ communication for identifying the new beam, and/or the like.

Some aspects described herein provide techniques and apparatuses for reporting new beam information (NBI). A new beam can generally be a beam having characteristics enabling communication relative to another beam instance (e.g., it can be a beam differing from one that previously experienced failure and/or a beam having improved characteristics enabling communications to occur again). A UE can be configured to communicate NBI during beam management procedures, including beam management and/or failure recovery scenarios. In some aspects, a UE may be configured to determine whether to include an NBI field and/or contents of the NBI field in a frame such as a BFRQ communication based at least in part on detecting a beam failure. The UE may determine whether to include the NBI field and/or contents of the NBI field in a frame based at least in part on one or more candidate beams that are transmitted from a BS, such as whether one or more reference signals are configured for the one or more candidate beams, whether a beam quality threshold is configured for the one or more reference signals, whether the beam quality threshold is satisfied, and/or the like. In this way, a UE is capable of identifying a new beam for various configurations of candidate beams, is capable of determining the format and/or content of information that is to be included in a BFRQ communication for identifying a new beam, and/or the like.

FIGS. 5A-5E are diagrams illustrating an example 500 of reporting new beam information in accordance with various aspects of the present disclosure. NBI reporting may be done in a BFR procedure and/or as part of other control signaling between communication devices (e.g. a UE and a BS). As shown in FIGS. 5A-5E, example 500 includes a base station (e.g., BS 110) and a user equipment (e.g., UE 120). In some aspects, BS 110 and UE 120 may be included in a wireless network and may be configured to communicate on a downlink and/or an uplink of a wireless communication link between BS 110 and UE 120. In some aspects, BS 110 may transmit a plurality of beams. In some aspects, BS 110 and UE 120 may communicate using one or more beams of the plurality of beams transmitted from BS 110. In some aspects, the one or more beams may be a part of a secondary cell (SCell) of BS 110. In scenarios where SCells are configured to aid in beam failure recovery (e.g., during mobility events), a SCell may have pre-configured reference signal transmissions for use in beam recovery or re-establishment.

Figure 5A:
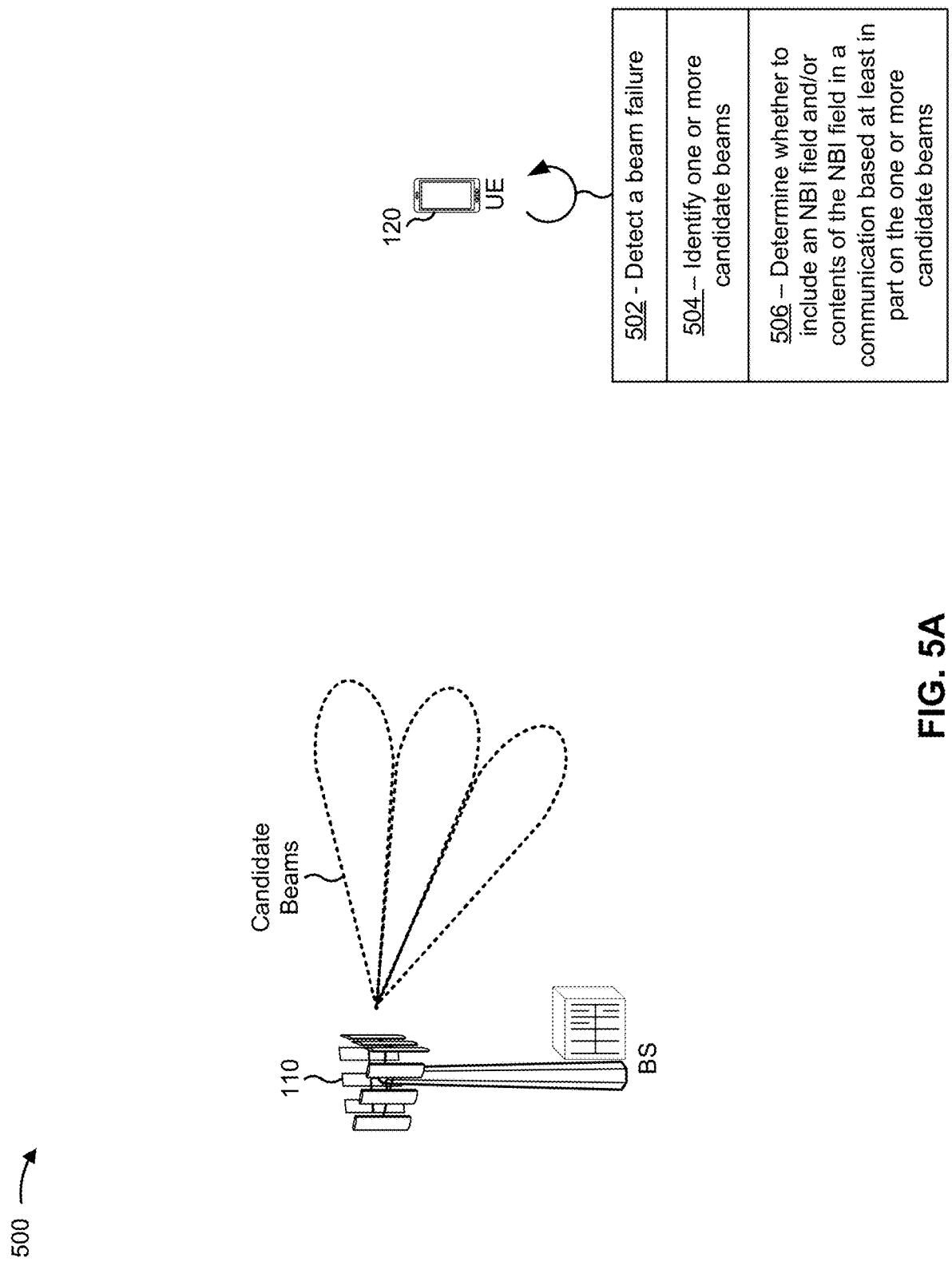
FIGS. 5A-5E are diagrams illustrating an example of reporting new beam information in a beam failure recovery (BFR) procedure, in accordance with various aspects of the present disclosure.

As shown in FIG. 5A, and by reference number 502, UE 120 may detect a beam failure of a beam that is used for communication between UE 120 and BS 110. In some aspects, UE 120 may detect the beam failure based at least in part on determining that one or more parameters associated with the beam do not satisfy a threshold. For example, UE 120 may determine that latency on the beam does not satisfy a latency threshold, may determine that interference on the beam does not satisfy an interference threshold, and/or the like.

In some aspects, UE 120 may initiate a beam failure recovery (BFR) procedure based at least in part on detecting the beam failure. In some aspects, a part of the BFR procedure may include selecting a new beam for communication between BS 110 and UE 120, and transmitting an indication of the new beam in a communication or a frame such as a BFRQ communication to BS 110.

As further shown in FIG. 5A, and by reference number 504, to select the new beam, UE 120 may identify one or more candidate beams that are transmitted from BS 110. The one or more candidate beams may be beams that are different from a failed beam and are available for UE 120 to select as the new beam for use in communication between BS 110 and UE 120. In some aspects, UE 120 may select a new beam from the one or more candidate beams based at least in part on various factors. For example, UE 120 may select a new beam based at least in part on performing one or more beam quality measurements for one or more candidate beams (e.g., a reference signal received power (RSRP) measurement, a reference signal received quality (RSRQ) measurement, a signal to interference plus noise ratio (SINR) measurement, a received signal strength indicator (RSSI) measurement, and/or the like). As another example, UE 120 may select the new beam based at least in part on a beam index associated with the new beam (e.g., based at least in part on the beam index, associated with the new beam, being the lowest beam index; based at least in part on the beam index, associated with the new beam, being the highest beam index, and/or the like).

As further shown in FIG. 5A, and by reference number 506, UE 120 may determine whether to include an NBI field in the BFRQ communication. UE 120 may determine whether to include the NBI field in the BFRQ communication based at least in part on various factors, such as whether one or more reference signals are configured for the one or more candidate beams, whether a beam quality threshold is configured for the one or more reference signals, whether the beam quality threshold is satisfied, and/or the like.

Figure 5B:
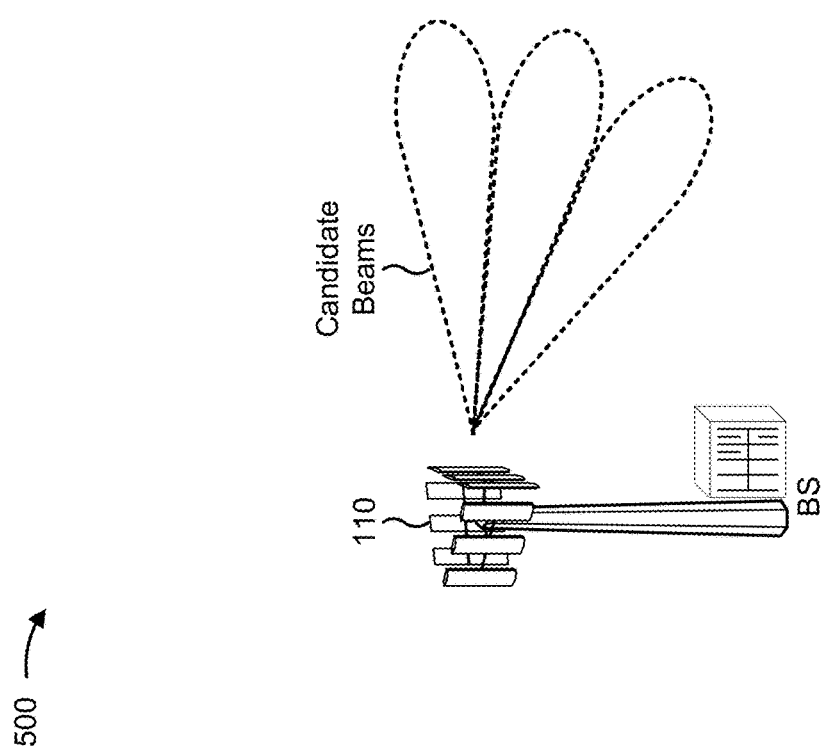

As shown in FIG. 5B, and by reference number 506A, UE 120 may determine whether to include a NBI field in and/or contents of a NBI field in communication scenarios. For example, in some aspects, UE 120 may include NBI in a communication. This can occur, for example, during a BFRQ communication based at least in part on whether one or more reference signals are configured for the one or more candidate beams. The one or more reference signals may include a channel state information (CSI) reference signal (CSI-RS), a demodulation reference signal (DMRS), and/or the like.

In some aspects, if one or more reference signals are not configured for the one or more candidate beams, UE 120 may determine to not include an NBI field and/or contents of the NBI field in the communication. In such scenarios, a UE may not include an indication of a selection of a new beam of the one or more candidate beams. But in some aspects, if one or more reference signals are not configured for the one or more candidate beams, UE 120 may determine to include an NBI field and/or contents of the NBI field in the communication, and may include, in the NBI field, an indication that no new beam, of the one or more candidate beams, is selected.

In some aspects, if one or more reference signals are not configured for the one or more candidate beams, UE 120 may determine whether to not include the NBI field in the communication or whether to include the NBI field and indicate, in the NBI field, that no beam is selected based at least in part on configuration information transmitted from BS 110. For example, BS 110 may transmit, to UE 120, an explicit indication in a signaling communication (e.g., a radio resource control (RRC) communication, a medium access control control element (MAC-CE) communication, a downlink control information (DCI) communication, and/ or the like) that configures UE 120 to not include the NBI field in the communication if UE 120 determines that one or more reference signals are not configured for the one or more candidate beams. As another example, BS 110 may transmit, to UE 120, an explicit indication in a signaling communication that configures UE 120 to include the NBI field and an indication, in the NBI field, that no new beam is selected if UE 120 determines that one or more reference signals are not configured for the one or more candidate beams. The indication may include a flag, a bit, a value, and/or the like in the NBI field.

Figure 5C:
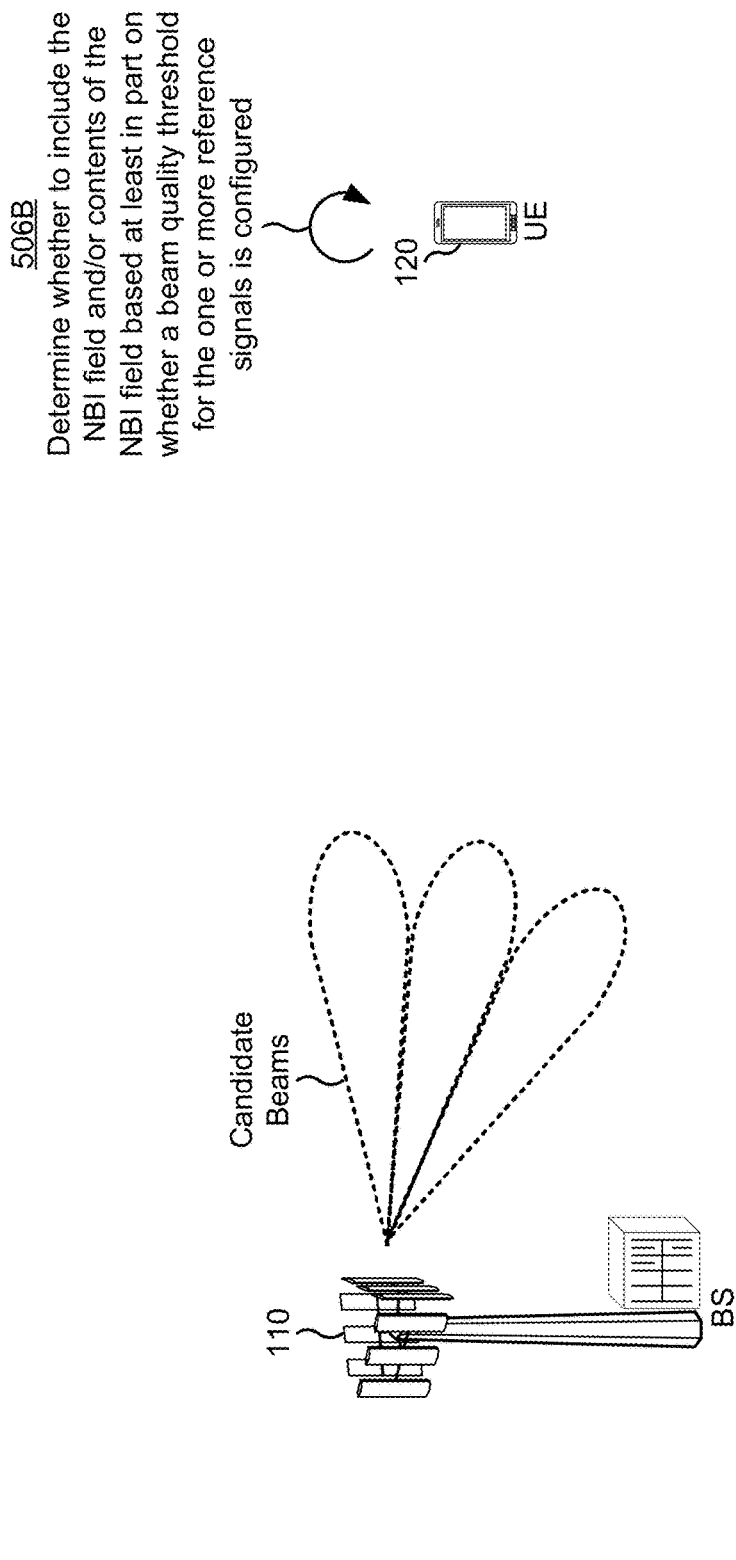

As shown in FIG. 5C, and by reference number 506B, if one or more reference signals are configured for the one or more candidate beams, UE 120 may determine whether to include the NBI field and/or contents of the NBI field in the communication based at least in part on whether a beam quality threshold is configured for the one or more reference signals. The beam quality threshold may include an RSRP threshold, an RSRQ threshold, an SINR threshold, an RSSI threshold, and/or the like. In some aspects, the beam quality threshold may be the same for the one or more candidate beams, may be different for a subset of the one or more candidate beams, and/or the like.

In some aspects, if the beam quality threshold is not configured for the one or more reference signals, UE 120 may determine to not include an NBI field in the communication (and thus, to not include an indication of a selection of a new beam in the BFRQ communication). In some aspects, if the beam quality threshold is not configured for the one or more reference signals, UE 120 may determine to include an NBI field in the communication, and to include, in the NBI field, an indication that no new beam of the one or more candidate beams is selected.

In some aspects, if the beam quality threshold is not configured for the one or more reference signals, UE 120 may determine to include, in the communication, an indication of a selection of a new beam of the one or more candidate beams. UE 120 may select the new beam based at least in part on the new beam having the best, highest, greatest, and/or most optimal beam quality measurement among the one or more candidate beams.

In some aspects, UE 120 may determine whether to select a new beam from the one or more candidate beams. This may occur if UE 120 determines that the beam quality threshold is not configured for the one or more reference signals based at least in part on receiving an explicit indication from BS 110. In some aspects, UE 120 may determine whether to include an NBI field in the communication based at least in part on receiving an explicit indication from BS 110. For example, BS 110 may transmit a signaling communication (e.g., an RRC communication, a MAC-CE communication, a DCI communication, and/or the like), to UE 120, that indicates whether to select a new beam if no beam quality threshold is configured, whether to include an NBI field in the communication, whether to include an indication, in the NBI field, that no new beam is selected if the beam quality threshold is not configured, and/or the like.

If the signaling communication indicates that UE 120 is to not include the NBI field (and thus, to not include the indication that no new beam is selected) in the communication, then UE 120 may determine to not include the NBI field in the communication. If the signaling communication indicates that UE 120 is to include the NBI field (and an indication, in the NBI field, that no new beam is selected) in the communication, then UE 120 may determine to include the NBI field in the communication.

If the signaling communication indicates that UE 120 is to include an indication of a selection of a new beam or include the indication that no new beam is selected in the communication, then UE 120 may include the indication of the selection of the new beam or the indication that no new beam is selected in the communication. The indication of the selection of the new beam or the indication that no new beam of the one or more candidate beams is selected may be included in the NBI field in the communication. The indication may include a flag, a bit, a value, and/or the like in the NBI field. The indication of the selection of the new beam may include an indication of a beam index associated with the new beam.

Figure 5D:
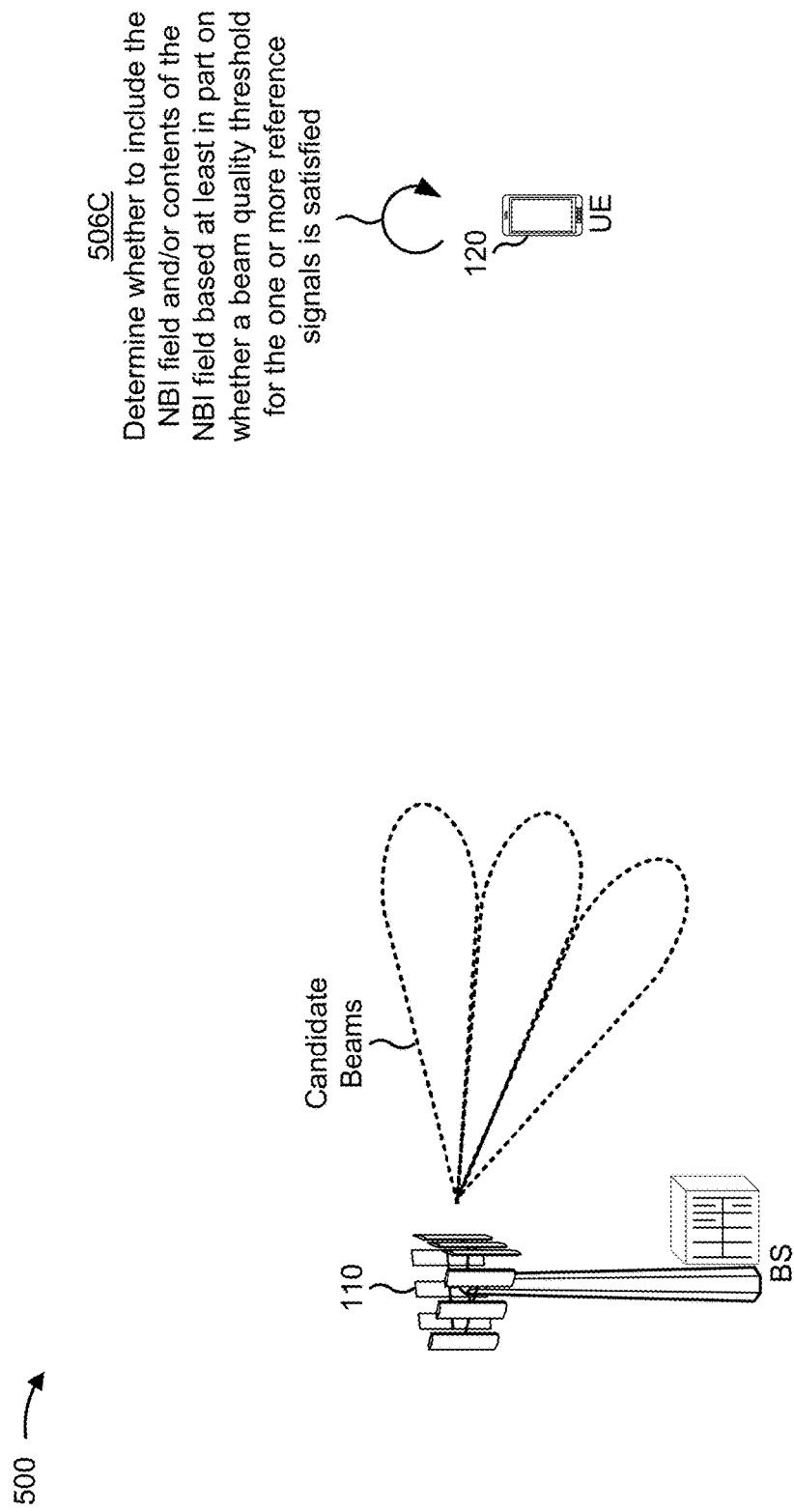

As shown in FIG. 5D, and by reference number 506C, if one or more reference signals are configured for the one or more candidate beams, and a beam quality threshold is configured for the one or more reference signals, UE 120 may determine whether to include the NBI field and/or contents of the NBI field in the communication based at least in part on whether any respective beam quality measurements, for the one or more reference signals, satisfy the beam quality threshold.

In some aspects, if UE 120 determines that a beam, of the one or more candidate beams, is the only beam of the one or more candidate beams that has a beam quality measurement that satisfies the beam quality threshold, UE 120 may select the beam as the new beam. In some aspects, if UE 120 determines that a plurality of beams, of the one or more candidate beams, have respective beam quality measurements that satisfy the beam quality threshold, UE 120 may select the new beam based at least in part on which beam has the best, highest, greatest, and/or most optimal beam quality measurement among the plurality of candidate beams. UE 120 may determine to include an NBI field (and an indication, in the NBI field, of the selection of the new beam) in the communication. The indication of the selection of the new beam may include an indication of the beam index associated with the new beam, an indication that the beam quality measurement for the new beam satisfies the beam quality threshold, and/or the like.

In some aspects, if UE 120 determines that no beam, of the one or more candidate beams, has a beam quality measurement that satisfies the beam quality threshold, UE 120 may determine to not include an NBI field in the communication (and thus, may determine to not include an indication of a selection of a new beam).

In some aspects, if UE 120 determines that no beam, of the one or more candidate beams, has a beam quality measurement that satisfies the beam quality threshold, UE 120 may determine to include an NBI field in the communication. If UE 120 determines to not select a new beam based at least in part on determining that no beam, of the one or more candidate beams, has a beam quality measurement that satisfies the beam quality threshold, then the NBI field may include an indication that no beam of the one or more candidate beams has a beam quality measurement that satisfies the beam quality threshold. If UE 120 determines to select a new beam based at least in part on determining that no beam, of the one or more candidate beams, has a beam quality measurement that satisfies the beam quality threshold, then the NBI field may include an indication that no beam of the one or more candidate beams has a beam quality measurement that satisfies the beam quality threshold, may include an indication of the selection of the new beam, may include an indication that the beam quality measurement associated with the new beam does not satisfy the beam quality threshold, and/or the like. In some aspects, UE 120 may select the new beam based at least in part on determining that the new beam has the best, highest, greatest, and/or most optimal beam quality measurement among the plurality of candidate beams.

In some aspects, UE 120 may determine whether to include an NBI field in the communication, whether to select a new beam even if none of the respective beam quality measurements satisfy the beam quality threshold, whether to include an indication that no beam of the one or more candidate beams has a beam quality measurement that satisfies the beam quality threshold, whether to include an indication of a selection of a new beam, and/or whether to include an indication that the beam quality measurement, associated with the new beam, does not satisfy the beam quality threshold, based at least in part on an explicit indication received from BS 110. For example, BS 110 may transmit, to UE 120, the explicit indication in a signaling communication (e.g., an RRC communication, a MAC-CE communication, a DCI communication, and/or the like) that indicates whether to select a new beam even if none of the respective beam quality measurements satisfy the beam quality threshold, whether to include an indication that no beam of the one or more candidate beams has a beam quality measurement that satisfies the beam quality threshold, whether to include an indication of a selection of a new beam, and/or whether to include an indication that the beam quality measurement associated with the new beam does not satisfy the beam quality threshold.

Figure 5E:
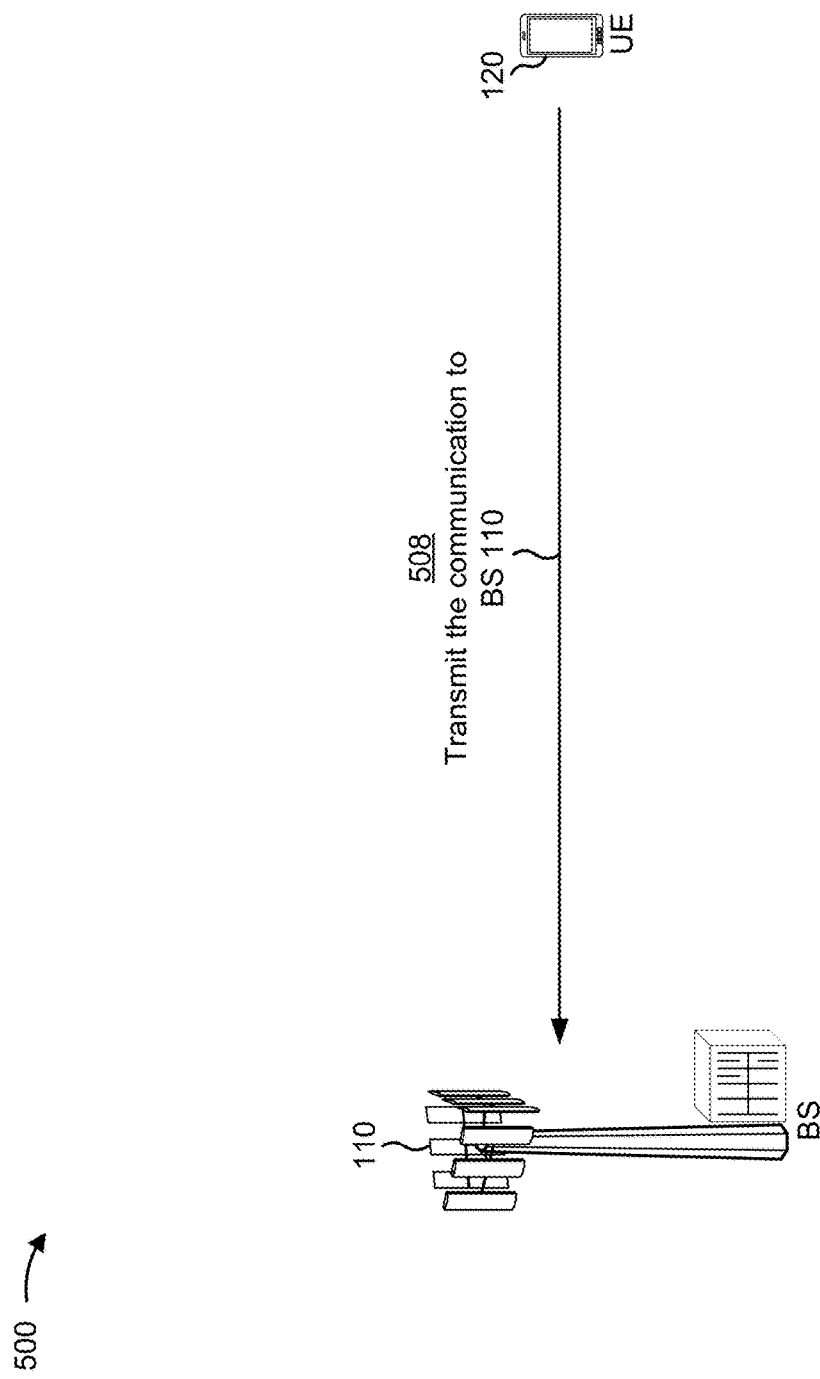

As shown in FIG. 5E, and by reference number 508, UE 120 may transmit the BFRQ communication to BS 110. BS 110 may receive the communication and may perform the BFR process to select a new beam for communication between BS 110 and UE 120. For example, if the communication does not include an NBI field (and thus, does not include an indication of a selection of a new beam), or if the communication includes an indication, in an NBI field, that no new beam is selected, BS 110 may select a new beam for UE 120. As another example, if the communication includes an indication, in an NBI field, of a selection of a new beam, BS 110 may identify the new beam, based at least in part on an indication of the beam index associated with the new beam, in the NBI field of the communication, and may select the new beam for communication between BS 110 and UE 120.

In this way, UE 120 may be configured to determine whether to include an NBI field and/or contents of the NBI field in the communication such as a BFRQ communication based at least in part on detecting a beam failure. UE 120 may determine whether to include the NBI field and/or contents of the NBI field in the communication based at least in part on one or more candidate beams that are transmitted from a BS 110, such as whether one or more reference signals are configured for the one or more candidate beams, whether a beam quality threshold is configured for the one or more reference signals, whether the beam quality threshold is satisfied, and/or the like. In this way, UE 120 is capable of identifying a new beam for various configurations of candidate beams, is capable of determining the format and/or content of information that is to be included in a communication for identifying the new beam, and/or the like.

As indicated above, FIGS. 5A-5E are provided as an example. Other examples may differ from what is described with respect to FIGS. 5A-5E.

Figure 6:
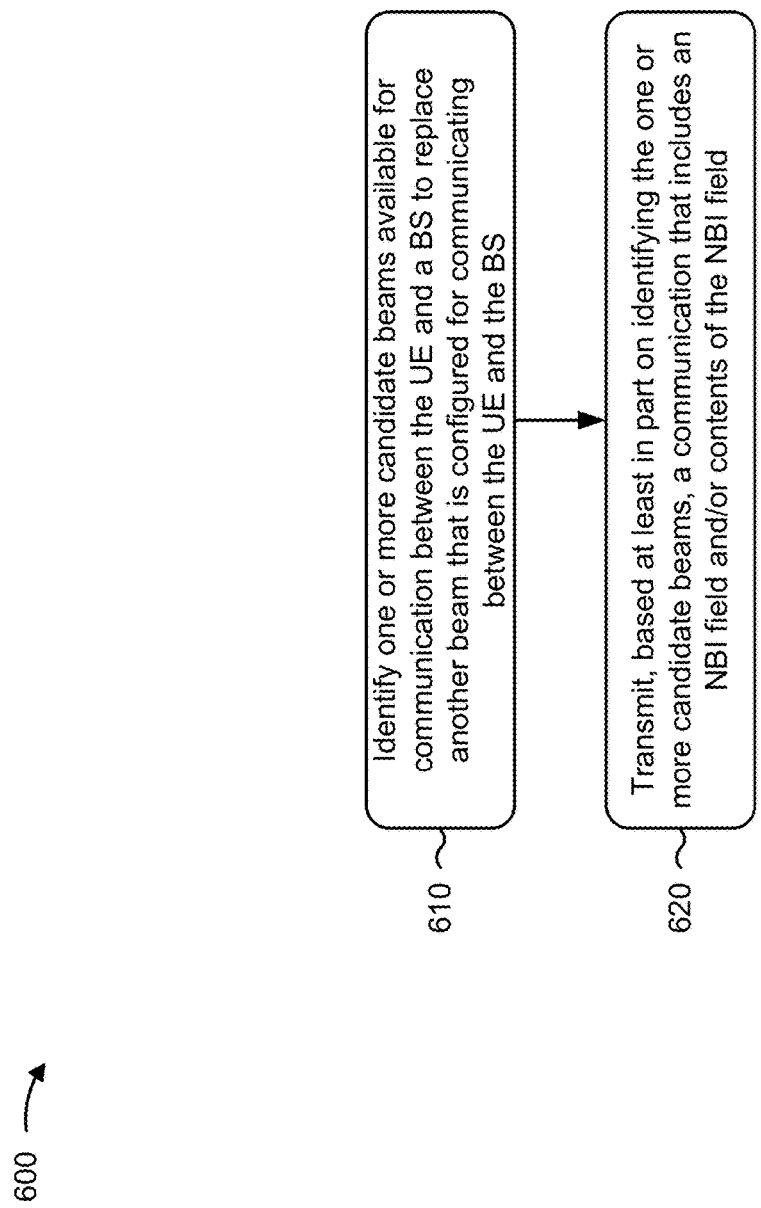

FIG. 6 is a diagram illustrating an example process 600 performed, for example, by a UE, in accordance with various aspects of the present disclosure. Example process 600 is an example where a UE (e.g., UE 120) performs operations associated with reporting new beam information in a BFR procedure.

As shown in FIG. 6, in some aspects, process 600 may include identifying one or more candidate beams available for communication between the UE and a BS to replace another beam that is configured for communicating between the UE and the BS (block 610). For example, the UE (e.g., using receive processor 258, transmit processor 264, controller/processor 280, memory 282, and/or the like) may identify one or more candidate beams available for communication between the UE and a BS to replace another beam that is configured for communicating between the UE and the BS, as described above.

As further shown in FIG. 6, in some aspects, process 600 may include transmitting, based at least in part on identifying the one or more candidate beams, a communication that includes an NBI field and/or contents of the NBI field (block 620). For example, the UE (e.g., using receive processor 258, transmit processor 264, controller/processor 280, memory 282, and/or the like) may transmit, based at least in part on identifying the one or more candidate beams, a communication that includes an NBI field and/or contents of the NBI field, as described above. In some aspects, the one or more candidate beams are different from the other beam. In some aspects, process 600 may include detecting a failure associated with the other beam and identifying the one or more candidate beams based at least in part on detecting the failure. Yet in other aspects, a candidate beam may be a beam previously deemed as failed and that has moved away from failure status (e.g., due to improving channel conditions, removed blockage, better transmit conditions, favored antenna array transmissions, etc.). In such scenarios, beams may be re-established or recycled in additional time instances.

Process 600 may include additional aspects, such as any single implementation or any combination of aspects described below and/or in connection with one or more other processes described herein.

In some aspects, the communication can be transmitted during a BFRQ communication. In some aspects, process 600 includes determining whether to include the NBI field and/or contents of the NBI field in the communication. In some aspects, determining whether to include the NBI field in the communication comprises determining that one or more reference signals are not configured for the one or more candidate beams; and determining, based at least in part on determining that the one or more reference signals are not configured for the one or more candidate beams, to not include the NBI field in the communication, or to use a reserved entry in the NBI field to indicate no new candidate beam is selected In some aspects, determining whether to include the NBI field in the communication comprises determining that one or more reference signals are not configured for the one or more candidate beams; and determining to include the NBI field in the communication based at least in part on determining that the one or more reference signals are not configured for the one or more candidate beams.

In some aspects, the NBI field includes an indication that no new beam of the one or more candidate beams is selected. In some aspects, determining to include the NBI field in the communication comprises determining to include the NBI field in the communication based at least in part on receiving an explicit indication, from the BS, to include the NBI field in the communication if the UE determines that the one or more reference signals are not configured for the one or more candidate beams. In some aspects, the explicit indication is included in at least one of an RRC communication, a MAC-CE communication, or a DCI communication.

In some aspects, determining whether to include the NBI field in the communication comprises determining that one or more reference signals are configured for the one or more candidate beams; determining whether a beam quality threshold is configured for the one or more reference signals; and determining whether to include the NBI field in the communication based at least in part on determining whether the beam quality threshold is configured for the one or more reference signals. In some aspects, determining whether the beam quality threshold is configured for the one or more reference signals comprises determining that the beam quality threshold is not configured for the one or more reference signals. In some aspects, determining whether to include the NBI field in the communication comprises determining to not include the NBI field in the communication based at least in part on determining that the beam quality threshold is not configured for the one or more reference signals.

In some aspects, determining whether the beam quality threshold is configured for the one or more reference signals comprises determining that the beam quality threshold is not configured for the one or more reference signals. In some aspects, determining whether to include the NBI field in the communication comprises determining to include the NBI field in the communication based at least in part on determining that the beam quality threshold is not configured for the one or more reference signals. In some aspects, the NBI field includes an indication that no new beam of the one or more candidate beams is selected, or an indication of a selection of a new beam of the one or more candidate beams based at least in part on a beam quality measurement, associated with the new beam, of the one or more reference signals.

In some aspects, the indication of a selection of a new beam comprises an indication of a beam index associated with the new beam. In some aspects, determining to include the NBI field in the communication comprises determining to include the NBI field in the communication based at least in part on receiving an explicit indication, from the BS, to include the NBI field in the communication if the UE determines that the beam quality threshold is not configured for the one or more reference signals. In some aspects, the explicit indication is included in at least one of an RRC communication, a MAC-CE communication, or a DCI communication.

In some aspects, determining whether to include the NBI field in the communication comprises determining that one or more reference signals are configured for the one or more candidate beams; determining that a beam quality threshold is configured for the one or more reference signals; generating, based at least in part on determining that the beam quality threshold is configured for the one or more reference signals, respective beam quality measurements for the one or more candidate beams; and determining whether to include the NBI field in the communication based at least in part on determining whether any of the respective beam quality measurements satisfy the beam quality threshold.

In some aspects, the beam quality threshold comprises at least one of an RSRP threshold, an RSRQ threshold, an SINR threshold, or an RSSI threshold. In some aspects, determining whether to include the NBI field in the communication comprises determining to include the NBI field in the communication based at least in part on determining that a beam quality measurement, of the respective beam quality measurements, associated with a candidate beam, of the one or more candidate beams, satisfies the beam quality threshold.

In some aspects, the NBI field includes at least one of an indication of a beam index associated with the candidate beam or an indication that the beam measurement, associated with the candidate beam, satisfies the beam quality threshold. In some aspects, determining whether to include the NBI field in the communication comprises determining that none of the respective beam quality measurements satisfy the beam quality threshold; and determining to not include the NBI field in the communication based at least in part on determining that none of the respective beam quality measurements satisfy the beam quality threshold.

In some aspects, determining whether to include the NBI field in the communication comprises determining that none of the respective beam quality measurements satisfy the beam quality threshold; and determining to include the NBI field in the communication based at least in part on determining that none of the respective beam quality measurements satisfy the beam quality threshold. In some aspects, the NBI field includes at least one of an indication that none of the respective beam quality measurements satisfy the beam quality threshold, an indication of a selection of a new beam of the one or more candidate beams, or an indication that the beam quality measurement, associated with the new beam does not satisfy the beam quality threshold.

In some aspects, the indication of the selection of the new beam comprises an indication of a beam index associated with the new beam. In some aspects, determining to include the NBI field in the communication comprises determining to include the NBI field in the communication based at least in part on receiving an explicit indication, from the BS, to include the NBI field in the communication if the UE determines that none of the respective beam quality measurements satisfy the beam quality threshold. In some aspects, the explicit indication comprises at least one of an RRC communication, a MAC-CE communication, or a DCI communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
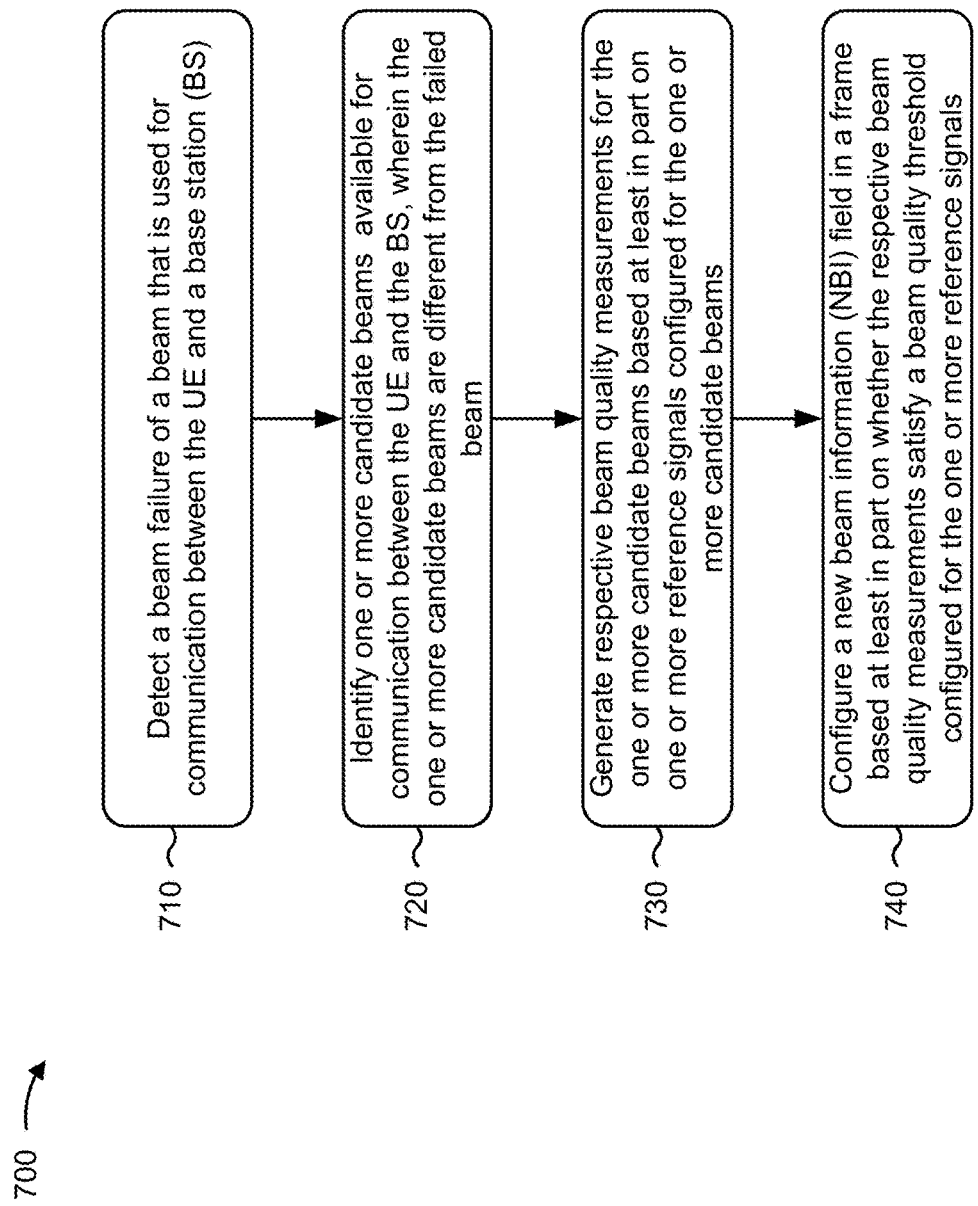

FIG. 7 is a diagram illustrating an example process 700 performed, for example, by a UE, in accordance with various aspects of the present disclosure. Example process 700 is an example where a UE (e.g., UE 120) performs operations associated with reporting new beam information in a BFR procedure.

As shown in FIG. 7, in some aspects, process 700 may include detecting a beam failure of a beam that is used for communication between the UE and a BS (block 710). For example, the UE (e.g., using receive processor 258, transmit processor 264, controller/processor 280, memory 282, and/or the like) may detect a beam failure of a beam that is used for communication between the UE and a BS, as described above.

As further shown in FIG. 7, in some aspects, process 700 may include identifying one or more candidate beams available for communication between the UE and the BS, where the one or more candidate beams are different from the failed beam (block 720). For example, the UE (e.g., using receive processor 258, transmit processor 264, controller/processor 280, memory 282, and/or the like) may identify one or more candidate beams available for communication between the UE and the BS, as described above. In some aspects, the one or more candidate beams are different from the failed beam.

As further shown in FIG. 7, in some aspects, process 700 may include generating respective beam quality measurements for the one or more candidate beams based at least in part on one or more reference signals configured for the one or more candidate beams (block 730). For example, the UE (e.g., using receive processor 258, transmit processor 264, controller/processor 280, memory 282, and/or the like) may generate respective beam quality measurements for the one or more candidate beams based at least in part on one or more reference signals configured for the one or more candidate beams, as described above.

As further shown in FIG. 7, in some aspects, process 700 may include configuring an NBI field in a communication based at least in part on whether the respective beam quality measurements satisfy a beam quality threshold configured for the one or more reference signals (block 740). For example, the UE (e.g., using receive processor 258, transmit processor 264, controller/processor 280, memory 282, and/or the like) may configure an NBI field in a communication based at least in part on whether the respective beam quality measurements satisfy a beam quality threshold configured for the one or more reference signals, as described above.

Process 700 may include additional aspects, such as any single implementation or any combination of aspects described below and/or in connection with one or more other processes described herein.

In a first aspects, configuring the NBI field in the communication comprises determining that none of the respective beam quality measurements satisfy the beam quality threshold and configuring the NBI field in communication to include an indication that none of the respective beam quality measurements satisfy the beam quality threshold. In a second aspect, alone or in combination with the first aspect, configuring the NBI field in the communication comprises determining that none of the respective beam quality measurements satisfy the beam quality threshold and configuring the NBI field in the communication to include an indication of a selection of a new beam, of the one or more candidate beams, having a highest beam quality measurement of the one or more candidate beams.

In a third aspect, alone or in combination with one or more of the first or second aspects, configuring the NBI field in the communication comprises determining that none of the respective beam quality measurements satisfy the beam quality threshold and configuring the NBI field in the communication to include an indication that no new beam is selected. In a fourth aspect, alone or in combination with one or more of the first through third aspects, the communication is a BFRQ communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with various aspects of the present disclosure. Example process 800 is an example where a UE (e.g., UE 120) performs operations associated with reporting new beam information in a BFR procedure.

As shown in FIG. 8, in some aspects, process 800 may include locating one or more candidate beams suitable for use in communication to replace another beam (block 810). For example, the UE (e.g., using receive processor 258, transmit processor 264, controller/processor 280, memory 282, and/or the like) may locate one or more candidate beams suitable for use in communication to replace another beam, as described above.

As further shown in FIG. 8, in some aspects, process 800 may include transmitting identification of a new beam to another communication device to resume communications (block 820). For example, the UE (e.g., using receive processor 258, transmit processor 264, controller/processor 280, memory 282, and/or the like) may transmitting identification of a new beam to another communication device to resume communications, as described above.

Process 800 may include additional aspects, such as any single implementation or any combination of aspects described below and/or in connection with one or more other processes described herein.

In some aspects, process 800 includes configuring the new beam information in a communication to include as part of the identification of the new beam for transmission to the other communication device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like. Thresholds may be static and/or dynamic. During communication scenarios, thresholds may be static so that comparisons thereto can occur. Comparisons to known threshold values can determine relative value. Dynamic thresholds enable movement of threshold values to accommodate changing communication scenarios (e.g., dynamic channel conditions, modified communication network operations, updated communication components, etc.). Thresholds may be associated with the various beams, channels, and/or signals discussed herein (e.g., reference signals, signal noise/interference ratios, power levels, etc.).

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying one or more candidate beams available for communication between the UE and a base station (BS) to replace another beam that is configured for communicating between the UE and the BS,
   the one or more candidate beams configured for beam failure recovery in a secondary cell (SCell); and
   transmitting, based at least in part on the one or more candidate beams, a communication that includes a new beam information (NBI) field, the NBI field comprising contents based at least in part on whether a beam quality measurement for a beam, of the one or more candidate beams, satisfies a beam quality threshold, and the beam quality threshold being configured if candidate beam reference signals are configured for beam failure recovery in the SCell.

2. The method of claim 1, further comprising:
determining whether to include the NBI field and/or the contents of the NBI field in the communication.

3. The method of claim 2, wherein determining whether to include the NBI field in the communication comprises:
determining that the candidate beam reference signals are configured for the one or more candidate beams;
determining that the beam quality threshold is configured for the one or more candidate beam reference signals; and
determining to include the NBI field in the communication based at least in part on determining the beam quality threshold is configured for the candidate beam reference signals.

4. The method of claim 1, wherein the beam quality threshold comprises at least one of:
a reference signal received power (RSRP) threshold,
a reference signal received quality (RSRQ) threshold,
a signal to interference plus noise ratio (SINR) threshold, or
a received signal strength indicator (RSSI) threshold.

5. The method of claim 1, wherein, when a candidate beam, of the one or more candidate beams, is determined to have the beam quality measurement that satisfies the beam quality threshold, the NBI field includes at least one of:
an indication of a beam index associated with the candidate beam, or
an indication that the beam measurement, associated with the candidate beam, satisfies the beam quality threshold.

6. The method of claim 1, wherein, when a candidate beam, of the one or more candidate beams, is determined to have the beam quality measurement that satisfies the beam quality threshold, the NBI field includes an indication of a selection of a new beam of the one or more candidate beams.

7. The method of claim 6, wherein the indication of the selection of the new beam comprises:
an indication of a beam index associated with the new beam.

8. The method of claim 1, wherein the communication is a beam failure recovery request (BFRQ) communication.

9. The method of claim 1, wherein identifying the one or more candidate beams comprises:
detecting a failure associated with the other beam.

10. The method of claim 1, wherein the NBI field includes:
an indication that no new beam of the one or more candidate beams is selected.

11. A user equipment (UE) for wireless communication, comprising:
a memory; and
one or more processors coupled to the memory, the memory and the one or more processors configured to:
identify one or more candidate beams available for communication between the UE and a base station (BS) to replace another beam that is configured for communicating between the UE and the BS, the one or more candidate beams configured for beam failure recovery in a secondary cell (SCell); and transmit, based at least in part on identifying the one or more candidate beams, a communication that includes a new beam information (NBI) field,
the NBI field comprising contents based at least in part on whether a beam quality measurement for a beam, of the one or more candidate beams, satisfies a beam quality threshold, and
the beam quality threshold being configured if candidate beam reference signals are configured for beam failure recovery in the SCell.

12. The UE of claim 11, wherein the beam quality threshold comprises at least one of:
a reference signal received power (RSRP) threshold,
a reference signal received quality (RSRQ) threshold,
a signal to interference plus noise ratio (SINR) threshold, or
a received signal strength indicator (RSSI) threshold.

13. The UE of claim 11, wherein, when a candidate beam, of the one or more candidate beams, is determined to have the beam quality measurement that satisfies the beam quality threshold, the NBI field includes:
an indication of a selection of a new beam of the one or more candidate beams.

14. The UE of claim 11, wherein the NBI field includes:
an indication that no new beam of the one or more candidate beams is selected.

15. A method of wireless communication performed by a user equipment (UE), comprising:
detecting a beam failure of a beam that is used for communication between the UE and a base station (BS);
identifying one or more candidate beams available for communication between the UE and the BS,
wherein the one or more candidate beams are different from the failed beam, and
wherein the one or more candidate beams are configured for beam failure recovery in a secondary cell (SCell);
generating respective beam quality measurements for the one or more candidate beams based at least in part on one or more reference signals configured for the one or more candidate beams; and
configuring a new beam information (NBI) field in a communication based at least in part on whether the respective beam quality measurements satisfy a beam quality threshold configured for the one or more reference signals,
the beam quality threshold being configured if the one or more reference signals are configured for beam failure recovery in the SCell.

16. The method of claim 15, wherein configuring the NBI field in the communication comprises:
determining that none of the respective beam quality measurements satisfy the beam quality threshold; and
configuring the NBI field in the communication to include an indication of a selection of a new beam, of the one or more candidate beams, having a highest beam quality measurement of the one or more candidate beams.

17. The method of claim 15, wherein configuring the NBI field in the communication comprises:
determining that none of the respective beam quality measurements satisfy the beam quality threshold; and
configuring the NBI field in the communication to include an indication that no new beam is selected.

18. The method of claim 15, wherein the communication is a beam failure recovery request (BFRQ) communication.

19. The method of claim 15, wherein the NBI field includes:
an indication that no new beam of the one or more candidate beams is selected.

20. A user equipment (UE) for wireless communication, comprising:
a memory; and
one or more processors operatively coupled to the memory, the memory and the one or more processors configured to:
detect a beam failure of a beam that is used for communication between the UE and a base station (BS);
identify one or more candidate beams available for communication between the UE and the BS,
the one or more candidate beams being different from the failed beam, and
the one or more candidate beams configured for beam failure recovery in a secondary cell (SCell);
generate respective beam quality measurements for the one or more candidate beams based at least in part on one or more reference signals configured for the one or more candidate beams; and
configure a new beam information (NBI) field in a communication based at least in part on whether the respective beam quality measurements satisfy a beam quality threshold configured for the one or more reference signals,
the beam quality threshold being configured if the one or more reference signals are configured for beam failure recovery in the SCell.

21. The UE of claim 20, wherein the one or more processors, when configuring the NBI field in the communication, are to:
determine that none of the respective beam quality measurements satisfy the beam quality threshold; and
configure the NBI field in the communication to include an indication of a selection of a new beam, of the one or more candidate beams, having a highest beam quality measurement of the one or more candidate beams.

22. The UE of claim 20, wherein the one or more processors, when configuring the NBI field in the communication, are to:
determine that none of the respective beam quality measurements satisfy the beam quality threshold; and
configure the NBI field in the communication to include an indication that no new beam is selected.

23. The UE of claim 20, wherein the communication is a beam failure recovery request (BFRQ) communication.

24. The UE of claim 20, wherein the NBI field includes:
an indication that no new beam of the one or more candidate beams is selected.

* * * * *